July 4, 1967 J. B. TREECE ETAL 3,328,839
APPARATUS FOR MOLDING CARPETS
Filed June 2, 1964 7 Sheets-Sheet 5

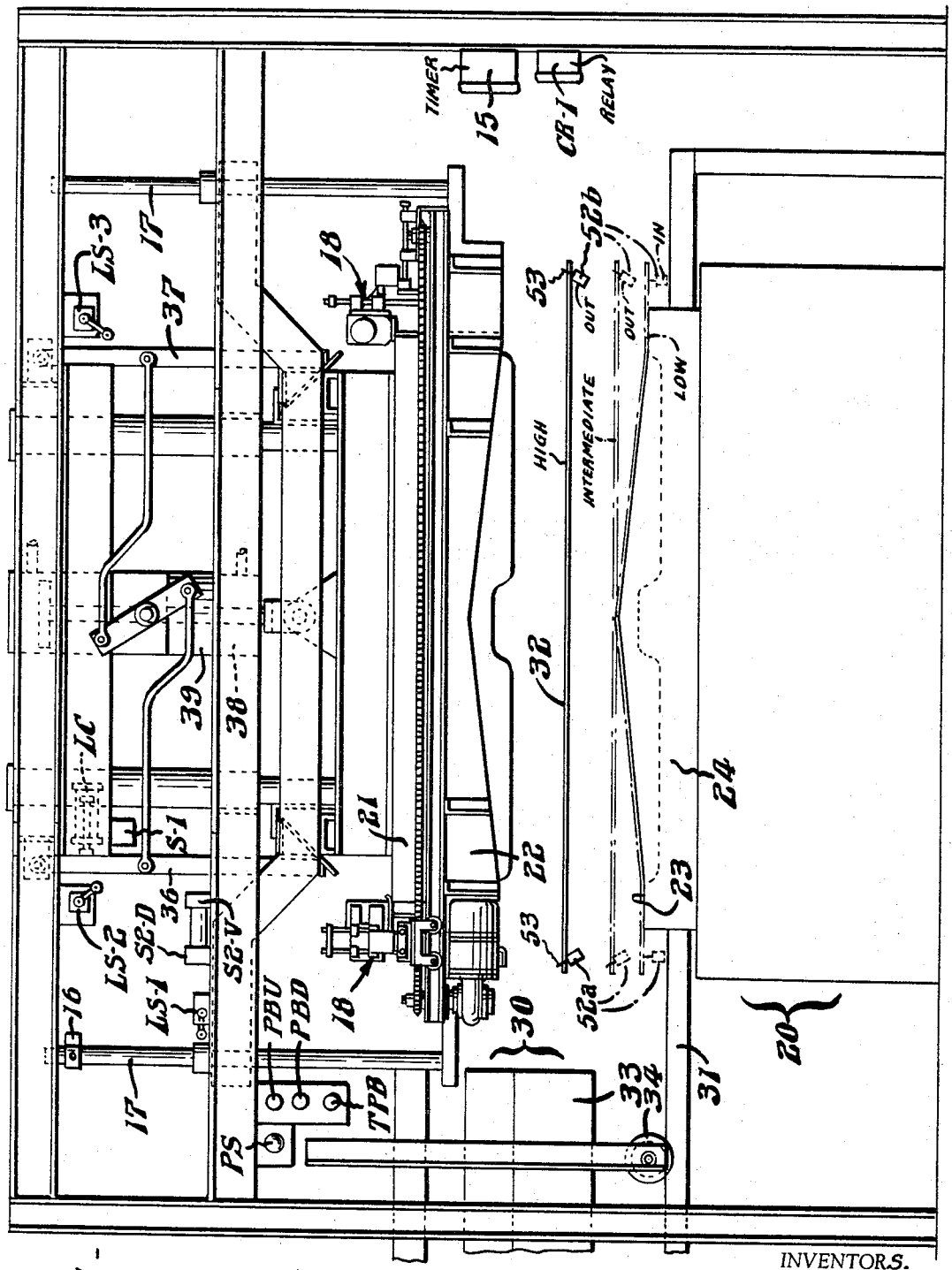

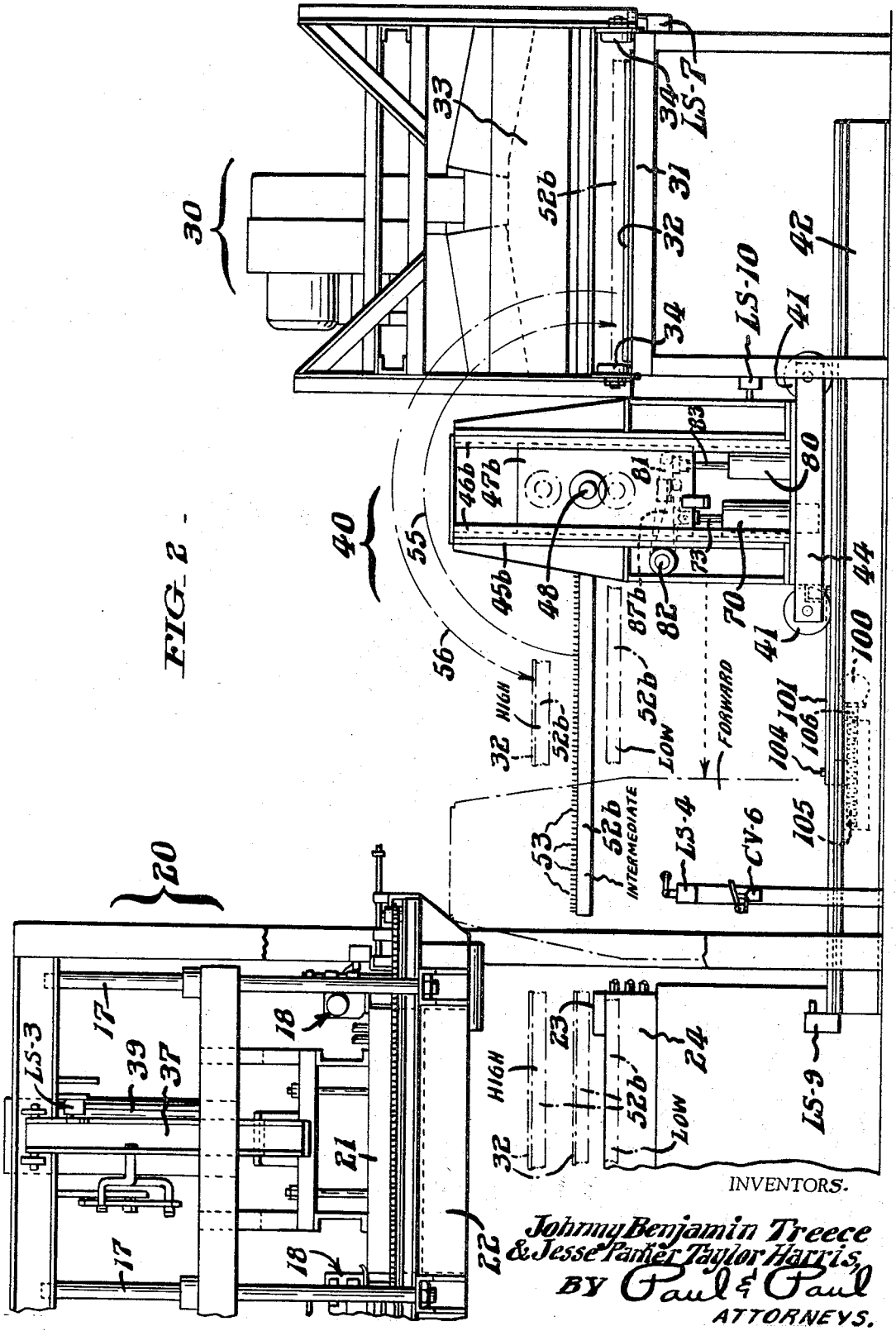

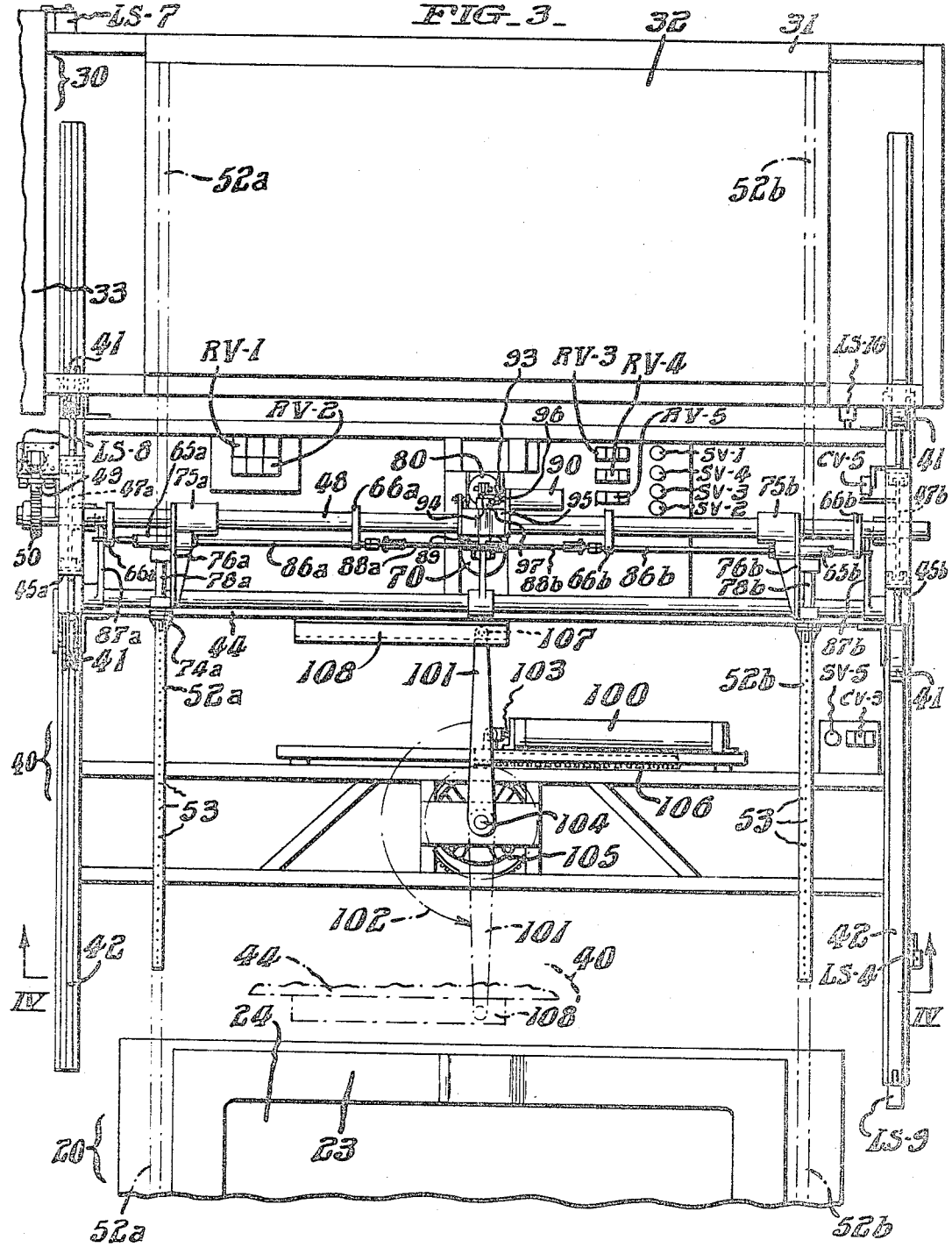

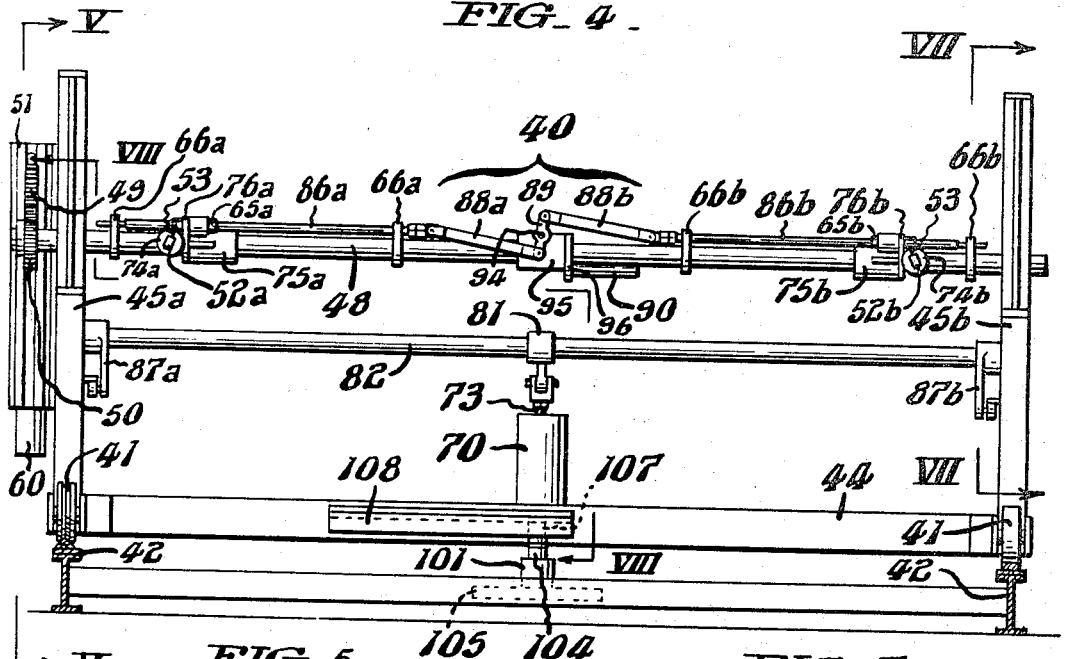
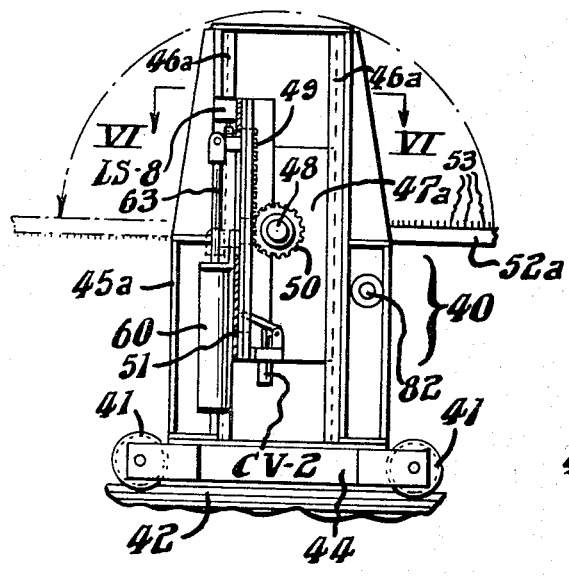
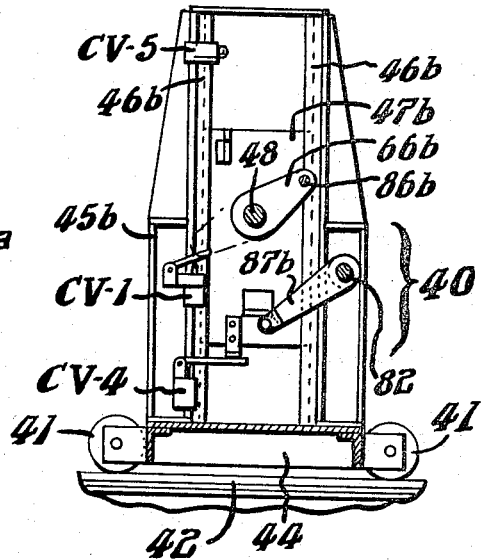
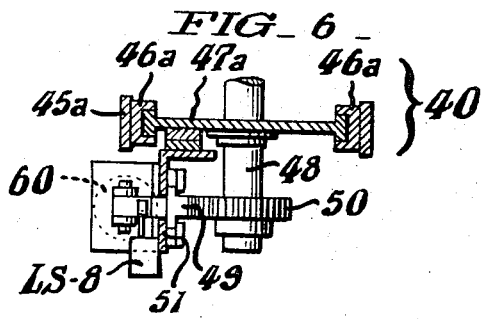

INVENTORS.
Johnny Benjamin Treece
& Jesse Parker Taylor Harris,
BY Paul & Paul
ATTORNEYS.

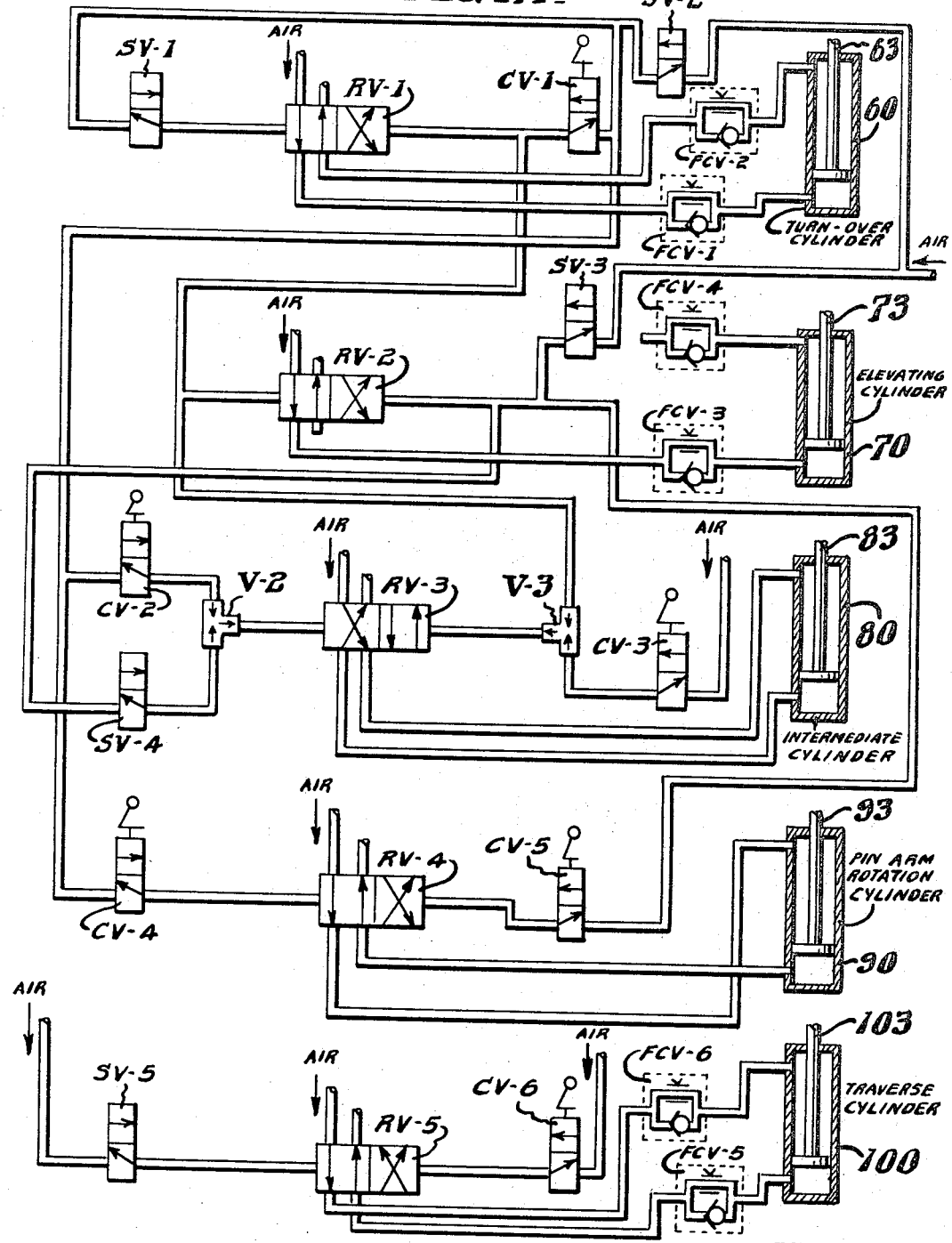

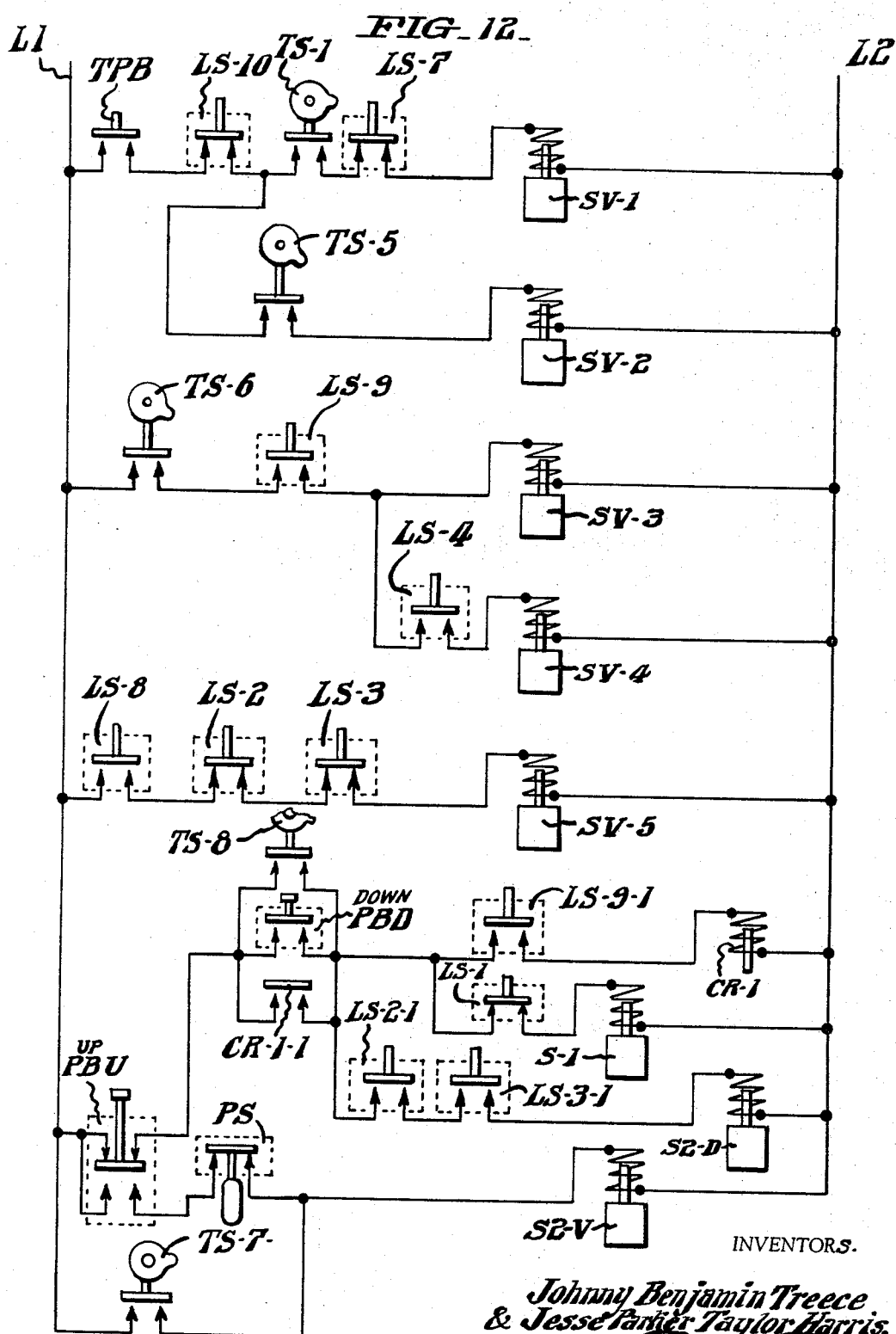

United States Patent Office 3,328,839
Patented July 4, 1967

3,328,839
APPARATUS FOR MOLDING CARPETS
Johnny Benjamin Treece, Albemarle, N.C., and Jesse Parker Taylor Harris, Jr., Bluefield, W. Va., assignors to Collins and Aikman Corporation, New York, N.Y., a corporation of Delaware
Filed June 2, 1964, Ser. No. 371,959
11 Claims. (Cl. 18—16)

This invention relates to apparatus for handling carpet blanks automatically. The apparatus is particularly adapted to picking up and transferring, from an oven to a press mold, carpet blanks such as are used in the molding of contoured floor carpets for the front and rear floors of automobiles. Similar apparatus may also be used to pick up and transfer the carpet blank from a supply source to the oven.

Floor mats for the front and rear floors of automobiles are ordinarily molded from flat carpet blanks to the back of which a thermoplastic coating, such as polyethylene, is applied. The coated fabric is then heated in an oven prior to placing the blank in the mold. After molding, the carpet may preferably be trimmed while still in the mold, using the trimming facilities described and claimed in copending patent application of Paul Junior Wilhoit and Gerald Kenneth Miller entitled Carpet Molding and Trimming, Ser. No. 364,714, filed May 4, 1964, assigned to the assignee of the present application.

The principal object of the present invention is to provide apparatus for handling automatically the carpet blanks used in the molding of floor carpets for automobiles.

A further object is to provide means for handling automatically the coated carpet blank from the time it is taken from a supply stack and placed in the oven to be heated until it is removed from the press mold fully molded and trimmed.

Other objects will be apparent from the description which follows.

These objects are accomplished, according to one embodiment of the present invention, by providing an automatically operated and controlled combination of apparatus the principal components of which are a press mold, an oven which is spaced from the press mold, and, between the oven and the press mold, a pick up and transport carriage for picking up the carpet blank at the oven, carrying it to and placing it automatically in the mold, then returning to the oven to repeat the operation cyclically, thereby to achieve substantially automatic performance of the carpet molding operation. In a preferred form, the press mold is equipped with cutter means for automatically trimming off the edge portions of the molded carpet while still in the mold.

A generally similar pick-up and transport carriage may also be used to transfer the carpet blanks from a supply source to the oven, and for the transfer of the molded carpet to subsequent operations.

In the drawing:

FIG. 1 is a front elevation of the press mold;

FIG. 2 is a side elevation of the combined apparatus showing on the left the press mold; on the right, the oven; and, between the press mold and oven, the traverse carriage which picks up the carpet blank at the oven position and transfers it to the mold;

FIG. 3 is a top plan view of the combined apparatus showing at the top of the page the oven position or heating table; at the bottom of the page a portion of the press mold; and in between, the traverse;

FIG. 4 is a front elevation of the traverse carriage looking in along the line IV—IV of FIG. 3;

FIG. 5 is a side elevation of the left elevator slide looking in along the line V—V of FIG. 4;

FIG. 6 is a top view, partly in section, of the left elevator slide looking down along the line VI—VI of FIG. 5;

FIG. 7 is a side elevation of the right elevator slide looking along the line VII—VII of FIG. 4;

FIG. 11 is a diagram of the pneumatic control system; and

FIG. 12 is a diagram of the electrical control circuits.

Figure 8:
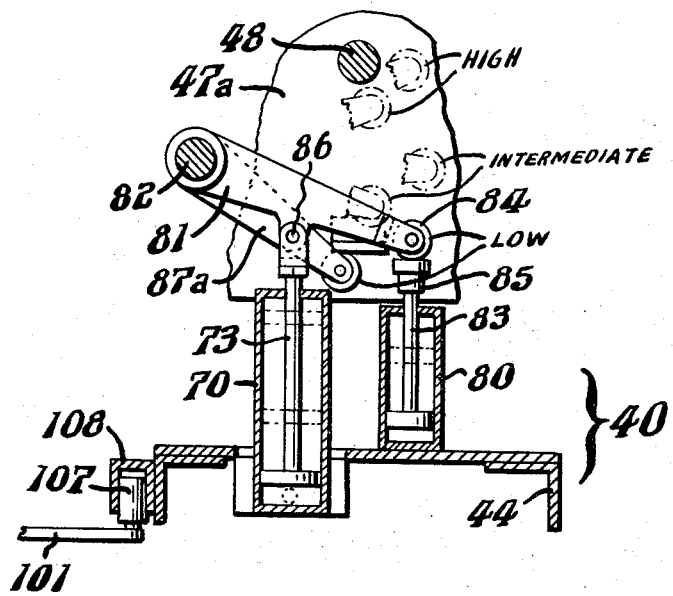
FIG. 8 is a side elevation showing the elevator shaft in section and showing the pneumatic pistons which control the movement of the elevator.

Referring now to FIG. 2, there is shown on the left a press mold 20, on the right an oven 30, and between the mold 20 and the oven 30 a traverse carriage 40 for transferring the carpet blank 32 from the oven position to the mold.

The oven 30 comprises a table 31 on which the carpet blank 32 is placed. A hooded heater 33 containing heat lamps or other heating elements is mounted on rollers 34 and adapted to be rolled forward over the carpet blank 32 and then withdrawn. In the side elevational view of FIG. 2, the heater hood 33 is rolled into and out of the paper. In the plan view of FIG. 3, the oven hood 33 is rolled back to the left, and only a fragment thereof is visible.

The traverse carriage 40 has four wheels 41 and is movable back and forth on tracks 42 between the oven 30 and the mold 20. The carriage 40 has a base 44 and at each side a vertical frame, 45a and 45b, on the left and right sides respectively. Each frame has a channel guide 46a and 46b, respectively, in which elevator slide plates 47a and 47b are slidable, upward and downward. Extending between the elevator slide plates 47a and 47b, and journalled for rotation therein, is a turn-over shaft 48. This shaft 48 is adapted to be rotated through 180° by a rack 49 and pinion 50 mounted on slide plate 47a at the left side of the traverse carriage 40. Pinion 50 is fixed on turnover shaft 48. Rack 49 is slidable vertically in a channel 51 secured to slide plate 47a as seen in FIG. 6.

Fixed to the turn-over shaft 48 are a pair of pick-up pin arms 52a and 52b, one near each of the elevator slide plates 47a and 47b. These pin arms extend either forwardly or rearwardly from the turnover shaft 48, depending upon the angular position of the shaft. Each of the pick-up pin arms 52a, 52b, is equipped with a plurality of tenter pins 53 which project upward when the arms are in their forwardly extending position, and downward when the arms extend rearwardly. In addition, the tenter pins 53 may be caused to project angularly outwardly, by rotating the pin arms 52a, 52b, angularly on their own axes.

Before describing further details of the structure of the apparatus, it will be helpful to describe, in a general way, the series of sequential steps, which are carried out by the machine as it operates automatically. For the purpose of this description, it will be assumed that the press mold 20 is open, that the oven hood 33 has subjected the carpet blank 32 to the necessary amount of heat to melt and fuse the polyethylene or other thermoplastic coating to the carpet backing to condition the carpet blank for molding, and that the oven hood 33 has been withdrawn to the rearward position shown in FIG. 3. The traverse carriage 40 is at its rearward position, near the oven table 31, as shown in FIG. 2, and its pick-up pin arms 52a, 52b extend forwardly toward the press mold 20. The pins 53 in the pin arms project straight up, and the elevator slide plates 47a, 47b, are at an intermediate height, thereby supporting the turnover shaft 48 and the pick-up pin arms at an intermediate height.

With the apparatus in the foregoing state, the automatic timing means starts the cycle, and the following series of steps take place in sequence. The pick-up pin arms 52a, 52b, turn over from the forward to the rearwardly extending position, and in doing so pass through a 180° arc, as indicated in FIG. 2 by the dot-and-dash line 55. The elevator slide plates 47a, 47b drop from the intermediate to the low position, carrying the turn-over shaft 48 and the pick-up pin arms downward and causing the now downwardly extending pins 53 to penetrate the carpet blank near the opposing edges. The pin arms 52a, 52b then turn outwardly, causing the downwardly projecting pins 53 to move diagonally outward, thereby placing the carpet blank under tension. The elevator slide plates 47a, 47b, then rise to the high position, carrying the shaft 48 and pick-up pin arms 52a, 52b upward. The carpet blank is also carried up, since it is stretched under tension between the pin arms.

Simultaneously with the raising of the elevator structure, the pick-up arms turn over from the rearwardly-extending to the forwardly-extending position, as indicated in FIG. 2 by the dot-and-dash arc 56. The traverse carriage 40 then moves forward with the pin arms 52a, 52b extending forwardly in the high elevator position carrying the carpet therebetween. The tenter pins 53 at this time point upwardly outwardly and the carpet is under tension therebetween.

When the traverse carriage 40 reaches the forward limit position, near the press mold 20, the pick-up pin arms 52a, 52b, extend by the mold, on either side thereof, as indicated by the dot-and-dash representation in FIG. 3. The elevator slide plates 47a, 47b, now drop to the intermediate position, carrying the pick up arms down, and at the same time the pick-up arms rotate on their own axes to move the pins 53 from an angularly outward to a straight-up position. This releases the carpet from tension, and the carpet blank is over the lower mold element ready to be molded.

The press mold 20 now closes. The upper mold element 21 and the surrounding compression ring 22 drop down. The compression ring 22 first contacts the ledge 23 of the lower mold element 24 and after the weight of the compression ring 22 is on the peripheral portions of the carpet blank, the elevator slide plates 47a, 47b drop from the intermediate to the low position, carrying the pin arms downward to the low position, and the male mold element contacts the center portion of the carpet blank, pressing it downwardly into the female mold element 24. The weight of the compression ring 22 on the peripheral portions of the carpet prevents wrinkles and folds from forming during the molding of the carpet.

The traverse carriage 40 now returns rearwardly to its limit position near the oven table 31, as shown in FIG. 2. The elevator slide plates then rise to the intermediate position. This completes the cycle of operation.

If the press mold 20 is equipped with travelling cutters for trimming off the peripheral edges of the molded carpet blank while the molded carpet is still in the mold, the trimming operation is started shortly after the mold closes.

The control means by which the above series of steps are actuated and controlled will now be described, with the assistance of FIGS. 11 and 12 showing the pneumatic and electrical control systems, respectively. It will again be assumed that the traverse carriage 40 is at its rearward limit position, near the oven table 31 and that the elevator slide plates 47a, 47b, are at their intermediate position.

To put the apparatus into operation, the push button TPB (FIG. 12) is manually closed, or the machine is activated by automatic timing means. This starts the timer and switch TS-5 on the timer cam shaft moves to closed position. Limit switch LS-10 was closed when the traverse carriage 40 reached its rearward limit position. The closing of switches TPB, LS-10, and TS-5 completes the electrical circuit through the winding of the solenoid pneumatic valve SV-2, and pneumatic valve SV-2 is moved to its open position, i.e., to the position in which it passes air. Reference to the pneumatic diagram of FIG. 11 will show, however, that valve SV-2 is in series with other pneumatic valves, such as SV-1, CV-1, CV-2, and CV-4. All of these latter valves are closed at this time. Accordingly, no air passes through the valve SV-2 at this time, even though it is open.

The heater hood 33 is, at this time, in its retracted position. Limit switch LS-7 (FIGS. 2 and 12) became closed when the heater hood reached its retracted position. Timer switch TS-1 on the timer cam shaft now closes. The closing of switch TS-1 completes the electrical circuit through the coil of the solenoid pneumatic valve SV-1, and valve SV-1 is moved to open position. Since valves SV-2 and SV-1 are now both open, the control air pressure is now applied to the left end of control valve RV-1 (as viewed in FIG. 11), and valve RV-1 is moved to the right, i.e., to the position shown in FIG. 11. The compressed air pressure is now connected through the control valve RV-1 to flow-control valve FCV-1 and regulated pressure is applied to the lower end of turn-over cylinder 60, as viewed in FIG. 11. This actuates the turnover cylinder 60 (FIG. 5) and turn-over shaft 48 is rotated through 180° to move the pick-up pin arms 52a and 52b through an arc of 180° from their forwardly-extending to their rearwardly-extending position. The pin arms are in their axially normal positions, and at the end of the turn-over stroke, the tenter pins 53 on the arms point straight downward.

Turning over of the pin arms 52a and 52b by the turn-over cylinder 60 is accomplished by a rack 49 and pinion gear 50 mounted on the left elevator slide plate 47a of the traverse carriage 40 (FIGS. 5 and 6). To turn the pin arms over from their forwardly-extending to their rearwardly-extending position, the rack 49 is moved downwardly by the turn-over cylinder 60. As the rack 49 reaches its lower limit, it encounters and actuates cam valve CV-2 (FIG. 5) to open position.

As seen in FIG. 11, valve CV-2 is in series with solenoid valve SV-2, and with both these valves now open, control pressure is now applied through shuttle valve V-2 to the left side of control valve RV-3, thereby driving valve RV-3 to the right, which is the position shown in FIG. 11. In this position, compressed air pressure is applied through the valve RV-3 to the upper end (as viewed in FIG. 11) of the intermediate elevating cylinder 80 to move the piston 83 of the intermediate elevating cylinder 80 from its intermediate to its low position (FIG. 8). This allows the lever arm 81, which is fixed to the elevator control shaft 82, to drop down from the intermediate to the low position, as indicated in FIG. 8. When this happens, the elevator slide plates 47a and 47b move down to the low position and the cam valve CV-4 (FIG. 7) which is mounted on the right elevator frame 45b is actuated to open position.

As seen in FIG. 11, valve CV-4 is in series with the solenoid valve SV-2, and since both of these valves are now open, control pressure is applied to the left side of control valve RV-4 to move the valve to the right, the position shown in FIG. 11 of the drawing. When this happens, air pressure is applied to the upper end (as viewed in FIG. 11) of pin-arm rotation cylinder 90, and this cylinder is actuated to rotate the pin arms 52a and 52b axially to the turn-out positions.

When the elevator slide plates 47a and 47b moved down to the low position, as previously described, the pin arms 52a and 52b dropped down and the tenter pins 53, pointing straight down, became imbedded in the carpet blank at opposite edges. When the pin arms are rotated axially by the pin-arm rotation cylinder 90 to the turn-out position, as just described above, the tenter pins 53 move angularly outward, thereby placing the carpet blank under tension.

When the pin arms 52a and 52b rotate axially to move the pins 53 from the straight-down position to the diagonally-downward-and-outward position, the cam valve CV-1 (FIG. 7) on the right elevator slide is cammed to open position. As seen in FIG. 11, valve CV-1 is in series with the solenoid valve SV-2, and with both of these valves now open, control air pressure is applied, through the shuttle valve V-3 to the right side of control valve RV-3. This drives the spool of valve RV-3 to the left, as viewed in FIG. 11. Air pressure is now connected through valve RV-3 to the lower end (as viewed in FIG. 11) of intermediate elevating cylinder 80 to move the piston 83 of intermediate elevating cylinder up to the so-called intermediate position (FIG. 8). This is actually the upper limit position of piston 83, but is referred to herein as the "intermediate" position since it raises lever arm 81 to its intermediate position, thereby rotating elevator shaft 82 and placing the elevator slide plates in their intermediate position.

With cam valve CV-1 open and solenoid valve SV-2 also open, as described above, control air pressure is also applied to the left side of control valve RV-2 to move the spool of valve RV-2 to the right position, the position shown in FIG. 11 of the drawing. In this position, air pressure is supplied through the flow control valve FCV-3 to the low end (as viewed in FIG. 11) of elevating cylinder 70. This causes the piston 73 of elevating cylinder 70 (FIG. 8) to move to its high position, and rotates the elevator shaft 82 to move the elevator slide plates 47a, 47b, to their high position. The pin arms 52a, 52b are thereby elevated to the high position, carrying the carpet blank stretched between them.

When cam valve CV-1 is actuated to open position, as described above, control pressure is also applied through the open solenoid valve SV-2 and open cam valve CV-1, in series, to the right side of control valve RV-1 to move the spool of control valve RV-1 to the left, as viewed in FIG. 11. Air pressure is now applied through the flow control valve FCV-2 to the upper end (as viewed in FIG. 11) of turn-over cylinder 60. This actuates the piston 63 of turn-over cylinder 60 (FIG. 5) in a direction to move the rack 49 upward. This turns the pinion gear 50 clockwise, as viewed in FIG. 5, and turnover shaft 48 is rotated clockwise through 180° to cause the pin arms 52a, 52b to swing from their rearward position to their forwardly-extending position through an arc indicated in FIG. 2 by the dot-and-dash line 56.

When the rack 49 reaches its upper limit, it contacts and actuates micro-switch LS-8 (FIG. 5) which now closes. The press mold 20 is in the open position and safety switches LS-2 and LS-3 (which are mounted on the upper frame of the mold as seen in FIG. 1) are both in closed position. Thus, as seen from FIG. 12, when micro-switch LS-8 closes, the electrical circuit through the winding of the solenoid valve SV-5 is completed and the solenoid valve SV-5 actuates to open position. Control pressure is now applied to the left side of control valve RV-5 (FIG. 11) and spool of valve RV-5 moves to the right, the position shown in FIG. 11. Air pressure is then applied, through valve RV-5 and through flow control valve FCV-6, to the upper end of the traverse cylinder 100, as viewed in FIG. 11. The piston 103 of traverse cylinder 100 (FIG. 3) is thereby actuated to move the arm 101 through an arc of 180° as indciated in FIG. 3 by the dot-and-dash line 102. This moves the traverse carriage 40 forward from the rearward limit position near the oven table to the forward limit position near the mold.

As the traverse carriage 40 moves forward, the elevator slide plates 47a, 47b, and hence the pin arms 52a, 52b are in the high position, as indicated in FIG. 2 by the dot-and-dash representation marked "high." The pin arms 52a, 52b at this time are in their "out" position, thereby maintaining tension on the carpet blank as it is carried forward toward the press mold 20.

When the traverse carriage 40 was still in the rearward position, and the elevator slide plates 47a, 47b moved to their high position, as described previously above, the cam valve CV-5 (FIG. 7) became actuated to open position. However, no control air flowed through valve CV-5 at that time since, as seen in FIG. 11, valve CV-5 is in series with solenoid valve SV-3, and solenoid valve SV-3 is closed. When the traverse carriage 40 reaches its forward limit, the limit switch LS-9 (FIG. 2) is actuated to closed position. When the switch TS-6 on the timer cam shaft closes (FIG. 12), the electrical circuit through the winding of solenoid valve SV-3 is completed, and the valve SV-3 is actuated to open position. Control pressure is then applied through valves SV-3 and CV-5 in series to the right side of control valve RV-4, and valve RV-4 moves to the left (as viewed in FIG. 11). Air pressure is now applied through valve RV-4 to the lower end of pin-arm rotation cylinder 90 and piston 93 of cylinder 90 moves in a direction to rotate the pin arms 52a, 52b axially to their "in" position in which the pins 53 are straight up.

When valve SV-3 is opened, as above described, control air pressure is also applied to the right side of control valve RV-2, and the spool of valve RV-2 moves to the left. Air pressure then exhausts from elevator cylinder 70 and the piston 73 (FIG. 8) drops, allowing the elevator slide plates and shaft 48 to drop of their own weight from the high to the intermediate position. The drop of the elevator structure is stopped at the intermediate position by lever 81 (FIG. 8) which encounters the raised piston 83 of the intermediate cylinder 80 which is in its "up" position, designated herein as the "intermediate" position.

When, with traverse carriage 40 in the forward position, the elevator slide plates 47a, 47b drop from the high to the intermediate position, the limit switch LS-4 (FIG. 2) is actuated to closed position. This completes the electric circuit through the winding of solenoid valve SV-4 (FIG. 12) and the solenoid valve SV-4 is actuated to open position (FIG. 11). Control pressure is now applied through open valves SV-3 and SV-4, in series, and shuttle valve V-2 to the left side of control valve RV-3 to move valve spool RV-3 to the right (as viewed in FIG. 11). Pressure is now applied through RV-3 to the upper end of intermediate cylinder 80 (as viewed in FIG. 11) and piston 83 (FIG. 8) moves down from the intermediate to its low position.

Movement of piston 83 to its low position allows the elevator shaft 82 to lower the slide plates 47a, 47b to their low position, and when this occurs, cam valve CV-6 (FIG. 2) is cammed open. Control pressure is now applied through valve CV-6 (FIG. 11) to the right side of control valve RV-5, and the spool of valve RV-5 is moved to the left (as viewed in FIG. 11). Pressure is now applied through valve RV-5 and flow control valve FCV-5 to the low end of traverse cylinder 100 (as viewed in FIG. 11) and piston 103 of cylinder 100 is actuated to move the traverse arm 101 through an arc of 180° to move the traverse carriage 40 from its forward to its rearward position.

When the carriage 40 moves to the rearward position, it actuates valve CV-3 to open position. Control pressure is now applied through shutttle valve V-3 to the right side of control valve RV-3 and the spool of valve RV-3 moves to the left. Pressure is now applied to the lower end of intermediate cylinder 80 to raise piston 83 to the intermediate position, and this raises the elevator structure to the intermediate position.

This completes one cycle of operation.

The physical structure of the important components of the apparatus will now be described, together with their mode of operation.

The physical structure and mode of operation of the turn-over means for turning over the pin arms between forward and rearward positions is probably already clear from what has previously been said above. Briefly restated, the turn-over shaft 48, journalled in the elevator slide plates 47a and 47b, is rotatable through 180° by the rack 49 and pinion 50 under the control of the turn-over cylinder 60. As seen in FIGS. 5 and 6, the rack 49 is movable up and down by the piston 63 of the turn-over cylinder 60.

Also probably clear, from FIG. 3 and from what has been said above, is the physical structure and manner of operation of the means for moving the traverse carriage 40. As seen in FIG. 3, the carriage 40 is movable forwardly and rearwardly by the arm 101. One end of arm 101 is fixed to the shaft 104 of a gear 105 which is rotatable by a rack 106. The other end of arm 101 is equipped with a cam roller 107 adapted to roll back and forth within an elongated cam-follower channel member 108 fixed to the frame of the carriage 40. Rack 106 is fixed to piston 103 of the traverse cylinder 100 and is movable back and forth by the piston 103. When the piston 103 is driven outward from the traverse cylinder 100, the rack 106 rotates the gear 105, counterclockwise as viewed in FIG. 3, and arm 101 is rotated through an arc of 180°, as indicated in FIG. 2 by the dot-and-dash line 102. This cams the channel member 108 and the carriage 40 from the rearward position shown in solid lines in FIG. 3 to the forward position shown in dot-and-dash lines.

It was previously described that the elevational position of the elevator slide plates 47a and 47b is controlled by the angular position of elevator control shaft 82, which is controlled by the arm 81, as shown in FIG. 8. Arm 81 is fixed to the elevator control shaft 82, and shaft 82 is supported for rotation in the elevator slide frames 45a and 45b. Fixed to shaft 82, adjacent the frames 45a and 45b, are arms 87a and 87b, the distal ends of which are pivotally secured to the elevator slide plates 47a and 47b, respectively.

Arm 81 is pivotally secured, at an intermediate point 86, to the distal end of piston 73 of the elevating cylinder 70. The distal end of arm 81 is provided with a cam roller 84 which rests on, but is not secured to, the enlarged head 85 of piston 83 of intermediate cylinder 80. Thus, the elevational position of arm 81 is controlled by either piston 73 or piston 83 of cylinders 70 and 80, respectively.

The elevator slide plates 47a, 47b (which support the turn-over shaft 48) are elevatable to the "high" position by piston 73 of cylinder 70 which, when fully extended, rotates shaft 82 angularly to its limit position. When cylinder 70 is exhausted, the weight of the elevator structure forces the slide plates 47a, 47b to drop, and arms 87a and 87b rotate in a direction to turn the shaft 82 angularly clockwise, as viewed in FIG. 8. Arm 81 is then driven clockwise downward. The extent to which the elevator structure falls is controlled by the position of piston 83 of cylinder 80. If the piston 83 is fully extended, the arm 81 is stopped in the "intermediate" position. Piston 83 is used to lower the elevator structure from the "intermediate" to the "low" position, and also to raise the elevator structure from the "low" to the "intermediate" position.

The structure and manner of operation of the pin arm rotation means will now be described. These means are visible in FIGS. 3 and 4. The means for rotating axially one of the pin arms (the left pin arm 52a) is shown enlarged and partly broken away in FIGS. 9 and 10. Similar means are used for supporting and rotating axially the right pin arm 52b.

Figure 9:
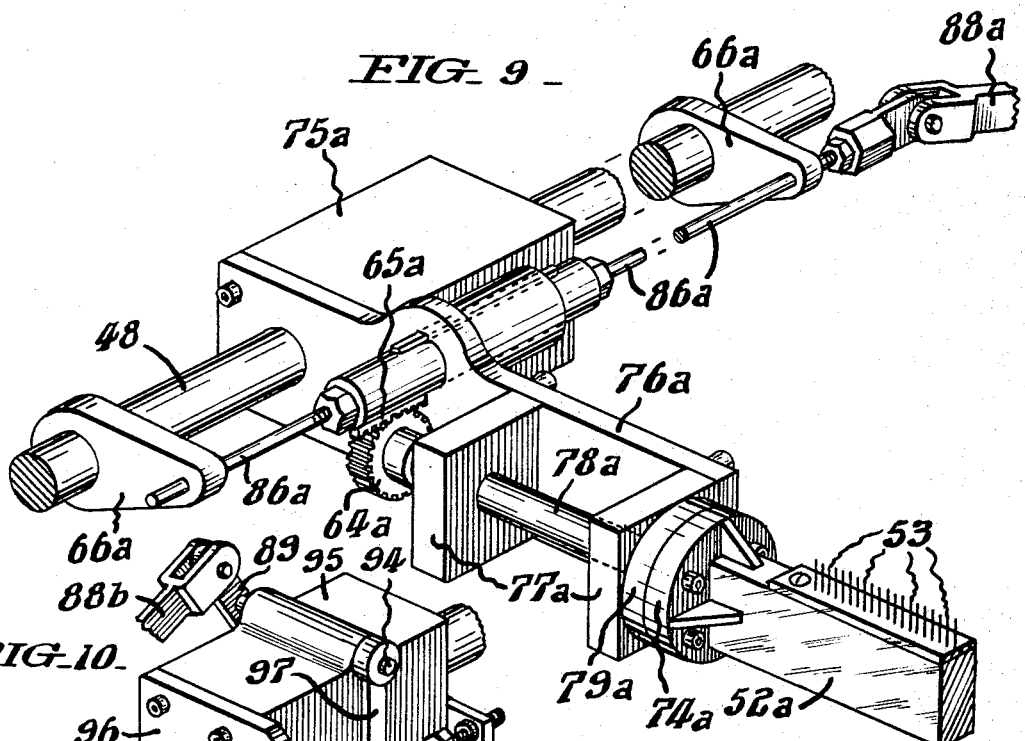
FIGS. 9 and 10 are pespective views of the mechanism which controls the rotation of the pick-up pin arms.

Referring now to FIG. 9, pin arm 52a terminates at its rearward end in an enlarged cylindrical foot 74a secured to the arm 52a. A block 75a is fixed on the turn-over shaft 48, and a bracket 76a is fixed to the block 75a. Thus, when the shaft 48 is angularly rotated through 180° by the rack and pinion 49, 50, of FIGS. 5 and 6, the bracket 76a moves through an arc of 180°. Bracket 76a is provided with a pair of lateral arms 77a which support a shaft 78a for rotation therein. The forward end of shaft 78a terminates in an enlarged cylindrical foot 79a which is bolted to the cylindrical foot 74a of pin arm 52a. Fixed to the rearward end of shaft 78a is a pinion 64a which meshes with a rack 65a. Rack 65a is keyed for lateral movement in bracket 76a. To each end of rack 65a pin-arm rotation control rods 86a are secured. These rods 86a are supported from turn-over shaft 48 as by brackets 66a.

If necessary, counter weights (not shown) may be secured to the rearward side of block 75a to balance the weight of the pin arm, the support bracket, the rotation control rods, etc.

The rotation mechanism for the right pin arm 52b is similar to that just described for the left pin arm 52a, and, similar parts for the right side are identified in FIGS. 3 and 4 by similar reference numerals having the suffix b.

Figure 10:
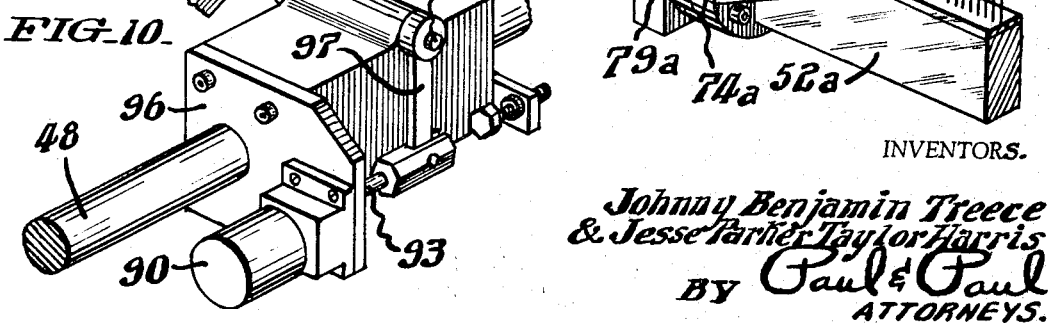

As best seen in FIG. 4, the left control rod 86a is pivotally connected, by a connecting rod 88a, to one end of a vertical pivot arm 89; and the right control rod 86b is pivotally connected, by a connecting rod 88b, to the other end of the pivot arm 89. Arm 89 is fixed, at its center, to the forward end of a shaft 94 which is rotatably mounted on a block 95 fixed to turn-over shaft 48 at the center thereof. The angular position of the pivot arm 89 is controlled by piston 93 of the pin arm rotation cylinder 90. As seen in FIG. 10, the pin arm rotation cylinder 90 is fixed by a bracket 96 to the block 95, and piston 93 is connected by a lever 97 to the rearward end of shaft 94. When the shaft 94 is rotated angularly by the piston 93, the pivot arm 89 is moved rotationally, thereby moving control rods 86a and 86b in opposing lengthwise directions. For example, when the pin arms 52a and 52b are in their forwardly-extending positions, and the pivot arm 89 is moved clockwise, as viewed in FIG. 4, the control rods 86a and 86b are both moved longitudinally outward. This rotates the left pinion 64a in a counterclockwise direction (as viewed in FIG. 9) and the right pinion in a clockwise direction, thereby rotating the pin arms 52a and 52b in corresponding directions, and thus causing the pins 53 to move from a straight-up to an outwardly inclined position.

This completees the description of the means for automatically picking up and transferring a carpet blank from the heater table to the press mold. Similar means may, if desired, be employed to pick up the carpet blanks, one at a time, from a supply stack and transfer the blank to the heater table.

The press mold may also be controlled automatically as a component of a completely automated system. The electric circuit shown in FIG. 12 includes means for controlling the mold, either automatically or manually, and the illustration in FIG. 1 indicates the positions of various limit switches and solenoid valves.

Referring now to FIGS. 1 and 12, the upper elements of the press mold may be lowered to close the mold by the closing of switch TS–8 mounted on the cam shaft of timer 15; or, the mold may be closed by momentarily closing manually the push button PBD. Reset switch LS–1 is normally closed and when either of the switches TS–8 or PBD is closed, the coil of solenoid valve S–1 is energized and the latch cylinder LC is actuated to push outward the latch arms 36 and 37. This clears the way for the lowering of the upper mold elements by the piston 38 of air cylinder 39.

If the traverse carriage 40 is at its forward limit position, the switch LS–9–1 is closed, and the closing of either of the switches TS–8 or PBD completes the electrical circuit through the hold relay CR–1. The operation of hold relay CR–1 closes the hold contacts CR–1–1 and locks up the circuit through the relay.

When the latch arms 36 and 37 are moved outward, as above described, the contacts LS-2-1 and LS-3-1 of switches LS-2 and LS-3 respectively, are moved to closed position. This completes the circuit through the winding of solenoid valve S2-D and this valve S2-D operates to apply air pressure to the upper end of cylinder 39 to drive the piston 38 downward, thereby to lower the mold to closed position.

After the upper mold elements have cleared the latch arms 36 and 37, the reset switch LS-1 is tripped to open position by the collar 16 on the compression ring support rod 17 (FIG. 1). This opens the circuit through the winding of solenoid valve S-1 and the valve S-1 is de-energized, thereby allowing the latch arms 36 and 37 to fall back to their normal positions.

The downward movement of the upper mold elements may be stopped at any time by manually depressing the up push button PBU. This opens the circuit through the hold relay CR-1 and closes the circuit through the winding of solenoid valve S2-V. Energization of valve S2-V applies air pressure to the lower end of main cylinder 39 and drives the piston 38 upward.

If desired, a pressure switch PS may be used to lock the mold in the down position when a pre-set pressure has been reached in the cylinder. This pressure is not reached until the mold is completely down. When the pre-set pressure is reached, the switch PS opens, thereby disabling the UP manual push button PBU.

Switch TS-7, which shunts the up push button PBU and the pressure switch PS, is located on the timer cam shaft. When switch TS-7 closes, the up solenoid valve S2-V is energized to raise the mold. The switch TS-7 maintains the mold operation in cycle regardless of how late the operator may have been in lowering the mold manually.

The press mold 20 may preferably be equipped with travelling cutter means, indicated generally in FIG. 1 by numeral 18, for trimming the peripheral edge portions of the molded carpet while the carpet is still in the mold, such cutter means may comprise four cutters, one on each side of the mold, for trimming, substantially simultaneously, the four edges of the carpet. The cutters may be secured to, or pushed along by, an endless chain mounted on a shelf surrounding the rectangular compression ring. The cutters may be controlled by the timer in combination with suitable limit switches and relays. The structural details of a preferred form of travelling cutter are given in the copending application previously referred to.

What is claimed is:

1. Apparatus for controlling automatically the molding of contoured carpets from flat carpet blanks, said apparatus comprising, in combination: a press mold; a pre-mold position spaced from said press mold; traverse carriage means for picking up a carpet blank at the pre-mold position, carrying it to the mold position, placing it in the press mold, and releasing the blank, said traverse carriage means including elevator means mounted on the traverse carriage and pick-up means mounted on the elevator means, said pick-up means including a pair of elongated arms having a plurality of tenter pins protruding therefrom in a normally vertical position, said elongated pick-up arms being mounted on turn-over means adapted to move said pick-up arms through an upward arc of 180° between a forwardly-extending position and a rearwardly-extending position, said pick-up means also including means for rotating said pick-up arms axially on their own longitudinal axes to turn said tenter pins between their normal position and an angularly outward position, means for returning the carriage means to the pre-mold position to pick up the next carpet blank; and control means for controlling automatically the sequential operations of said carriage means.

2. Apparatus as claimed in claim 1 characterized in that said control means for controlling automatically the sequential operations of said carriage means comprises electro-fluid-pressure means.

3. Apparatus as claimed in claim 2 characterized in that the electro-fluid-pressure means are electro-pneumatic means.

4. Apparatus as claimed in claim 3 further characterized in that said electro-pneumatic control means controls the traverse carriage means, the elevator means, the pick-up means, the turn-over means, and the means for axially rotating the pick-up arms.

5. Apparatus as claimed in claim 4 further characterized in that electro-pneumatic means are also provided for controlling the closing and opening of said press mold.

6. Apparatus as claimed in claim 5 further characterized in that oven means are provided at said pre-mold position for heating the carpet blanks, and in that said oven means includes a hooded heater movable into and out of the pre-mold position for heating one carpet blank at a time.

7. Apparatus as claimed in claim 6 characterized in that track means are provided for the traverse carriage means between the heater and mold positions.

8. Apparatus as claimed in claim 7 characterized in that the elevator means includes a slide frame on each side of the carriage, an elevator slide plate in each of the slide frames, an elevator control shaft extending between and supported by the two slide frames, arms fixed to said elevator control shaft at opposite ends thereof and pivotally connected to each slide plate, lever arm means fixed to said elevator control shaft at an intermediate point, and piston means controlled by said electro-pneumatic control means for moving said lever arm means to rotate said elevator control shaft.

9. Apparatus as claimed in claim 8 characterized in that said turn-over means includes a turn-over shaft which extends between said elevator slide plates and is rotatably supported therein, rack and pinion means for rotating said turn-over shaft, and second piston means controlled by said electro-pneumatic control means for rotating said turn-over shaft.

10. Apparatus as claimed in claim 9 characterized in that said pick-up arms are fixed to said turn-over shaft.

11. Apparatus as claimed in claim 10 characterized in that said means for rotating said pick-up arms axially on their own axis includes rack and pinion means, and third piston means controlled by said electro-pneumatic control means for actuating said rack and pinion means.

References Cited

UNITED STATES PATENTS

| 2,623,648 | 12/1952 | Rowe | 214—147 |
| 3,019,478 | 2/1962 | Erickson et al. | 18—16 X |
| 3,182,813 | 5/1965 | Goodell et al. | 214—1 |
| 3,228,357 | 1/1966 | Bruschke et al. | 198—178 X |

FOREIGN PATENTS

| 545,939 | 1956 | Italy. |

J. SPENCER, OVERHOLSER, Primary Examiner.

E. MAR, Assistant Examiner.